(12) United States Patent
Nishimi

(10) Patent No.: US 8,316,423 B2
(45) Date of Patent: Nov. 20, 2012

(54) IMAGE FORMING APPARATUS, KEY MANAGEMENT SERVER, ACTIVATION SYSTEM, AND DEACTIVATION SYSTEM

(75) Inventor: Toshitsugu Nishimi, Osaka (JP)

(73) Assignee: Kyocera Document Solutions Inc. (JP)

( * ) Notice: Subject to any disclaimer, the term of this patent is extended or adjusted under 35 U.S.C. 154(b) by 621 days.

(21) Appl. No.: 12/474,650

(22) Filed: May 29, 2009

(65) Prior Publication Data

US 2009/0310787 A1    Dec. 17, 2009

(30) Foreign Application Priority Data

Jun. 17, 2008 (JP) .................. 2008-157771
Jun. 17, 2008 (JP) .................. 2008-157772
Jun. 17, 2008 (JP) .................. 2008-157773
Jun. 17, 2008 (JP) .................. 2008-157774
Jun. 17, 2008 (JP) .................. 2008-157775

(51) Int. Cl.
*G06F 7/04* (2006.01)
*G06F 15/16* (2006.01)
*G06F 17/30* (2006.01)

(52) U.S. Cl. ............. 726/5; 726/16; 726/17; 726/21; 726/27; 726/29

(58) Field of Classification Search ........... 726/16, 726/17, 21, 27, 29
See application file for complete search history.

(56) References Cited

U.S. PATENT DOCUMENTS

| | | | |
|---|---|---|---|
| 2004/0110494 A1* | 6/2004 | Cohen et al. | 455/414.1 |
| 2006/0059571 A1* | 3/2006 | Chen et al. | 726/29 |
| 2006/0064761 A1* | 3/2006 | Multerer et al. | 726/27 |
| 2008/0002221 A1 | 1/2008 | Fujikura et al. | |
| 2008/0005029 A1 | 1/2008 | Ando | |

FOREIGN PATENT DOCUMENTS

| | | |
|---|---|---|
| JP | 2000-132291 | 5/2000 |
| JP | 2002-297255 | 10/2002 |
| JP | 2003-004689 | 2/2003 |
| JP | 2004-514984 | 5/2004 |
| JP | 2004-206342 | 7/2004 |
| JP | 2006-018770 | 1/2006 |
| JP | 2008-016013 | 1/2008 |

* cited by examiner

*Primary Examiner* — Peter Shaw

(57) ABSTRACT

The image forming apparatus has: a network communication unit capable of communicating with a web server via a network; a web browser that accesses the web server via communication by the network communication unit, and acquires an activation key from the web server; and an activating unit that activates an optional function with the activation key. The key management server machine has: an activation key generating unit that generates an activation key corresponding to an optional function of an image forming apparatus; and a web server that receives identification information on the image forming apparatus and identification information on the optional function, and transmits an activation key to the image forming apparatus, the activation key corresponding to an optional function specified by the identification information on the optional function.

5 Claims, 13 Drawing Sheets

| OPTIONAL FUNCTION CODE | ACTIVATION STATUS |
|---|---|
| 1001 | NOT ACTIVATED |
| 1002 | ACTIVATED |
| ⋮ | ⋮ |
| 3001 | NOT ACTIVATED |

| USER ID | MFP ID | OPTIONAL FUNCTION CODE | ACTIVATION STATUS | NUMBER OF TIMES OF ACTIVATIONS |
|---|---|---|---|---|
| A0381 | K0817 | 1002 | ACTIVATED | 1 |
| A0381 | K0817 | 1003 | DEACTIVATED | 1 |
| ... | | | | |
| B8270 | K0053 | 1001 | ACTIVATED | 2 |
| B8270 | K0053 | 1003 | ACTIVATED | 1 |
| ... | | | | |
| B9320 | K7918 | 1001 | DEACTIVATED | 1 |
| ... | | | | |

IMAGE FORMING APPARATUS, KEY MANAGEMENT SERVER, ACTIVATION SYSTEM, AND DEACTIVATION SYSTEM

CROSS-REFERENCE TO RELATED APPLICATIONS

This application relates to and claims priority rights from Japanese Patent Applications:
No. 2008-157771, filed on Jun. 17, 2008,
No. 2008-157772, filed on Jun. 17, 2008,
No. 2008-157773, filed on Jun. 17, 2008,
No. 2008-157774, filed on Jun. 17, 2008, and
No. 2008-157775, filed on Jun. 17, 2008,
the entire disclosures of which are hereby incorporated by reference herein.

BACKGROUND OF THE INVENTION

1. Field of the Invention

This invention relates to image forming apparatuses, key management servers, activation systems, and deactivation systems.

2. Description of the Related Art

Some multi-function peripherals have not only standard functions but also optional functions. However, in a default state, a user can not use the optional functions. If a user purchases an activation key for an optional function from a vendor, and imports it into a multi-function peripheral, then the user can use the optional function of the multi-function peripheral. The user purchases a USB memory product that the activation key has been stored in, and connects the USB memory product to the multi-function peripheral, and inputs a predetermined operation to the multi-function peripheral for the activation. According to the operation, the activation key is read out from the USB memory product, and imported into the multi-function peripheral.

Further, when the user returns the activation key, the user returns the USB memory product to the vendor after the activation by the activation key is canceled in the multi-function peripheral.

SUMMARY OF THE INVENTION

However, costs are necessary to produce and distribute a physical medium such as the USB memory product for activating an optional function of a multi-function peripheral in the aforementioned method. In addition, after a user obtains a USB memory product that an activation key has been stored in, the user must input an operation to a multi-function peripheral for activation. Therefore, a lot of time is required until activation is done.

Further, due to the physical medium to carry an activation key, an illegal copy of the physical medium may be produced, and after returning the physical medium to a vendor, the optional function may be used with the illegal copy of the physical medium.

In view of the aforementioned circumstance, an object of this invention is to provide an activation system capable of performing activation at low costs without any physical media such as USB memory product, and to provide an image forming apparatus and a key management server machine available in the activation system.

Further, another object of this invention is to provide a deactivation system capable of not only performing deactivation at low costs without any physical media such as USB memory product but also preventing an illegal use of an optional function after deactivation of the optional function, and to provide an image forming apparatus and a key management server machine available in the deactivation system.

The present invention solves these subjects as follows.

An image forming apparatus according to the first aspect of this invention has: a network communication unit capable of communicating with a web server via a network; a web browser that accesses the web server via communication by the network communication unit, and acquires an activation key from the web server; and an activating unit that activates an optional function with the activation key acquired by the web browser.

Therefore, the image forming apparatus directly acquires an activation key from a web server by the web browser without any physical media such as USB memory product, and consequently, activation is performed at low costs. Further, by means of the web browser, it is possible to easily produce a user interface used for the activation.

Further, the aforementioned image forming apparatus according to the first aspect may be as follows. The image forming apparatus may have: a display unit that displays information to a user; and an input unit that receives a user operation. The web browser may cause the display unit to display identification information on an optional function, and if the input unit receives a predetermined user operation, the web browser may acquire an activation key for the optional function.

Therefore, by means of the web browser, it is possible to easily produce a user interface used for the activation.

Further, any of the aforementioned image forming apparatuses according to the first aspect may be as follows. The web browser may cause the display unit to display identification information on an optional function and identification information on this image forming apparatus according to web-page data that contains the identification information on an optional function and the identification information on this image forming apparatus.

Further, any of the aforementioned image forming apparatuses according to the first aspect may be as follows. The web browser may cause the display unit to display identification information on an optional function and identification information on this image forming apparatus. If the input unit receives the predetermined user operation, the web browser may transmit the identification information on the optional function and the identification information on this image forming apparatus to the web server, and may acquire an activation key generated corresponding to the identification information on the optional function and the identification information on this image forming apparatus.

Therefore, by means of the web browser, it is possible to easily produce a user interface used for the activation.

Further, any of the aforementioned image forming apparatuses according to the first aspect may be as follows. The image forming apparatus may have: a display unit that displays information to a user; and an input unit that receives a user operation. The web browser may cause the display unit to display a list of one or more optional functions, and may acquire an activation key from the web server for an optional function selected from the list by the user operation.

Therefore, by means of the web browser, it is possible to easily produce a user interface used for the activation.

Further, any of the aforementioned image forming apparatuses according to the first aspect may be as follows. The web browser may cause the display unit to display the list according to web-page data that contains a list of one or more optional functions.

Further, any of the aforementioned image forming apparatuses according to the first aspect may be as follows. The image forming apparatus may have a storage unit that stores identification information on an optional function and identification information on this image forming apparatus. The web browser may read out identification information on the selected optional function from the storage unit, and may cause the display unit to display the identification information on the selected optional function, and if the input unit receives the predetermined user operation, the web browser may acquire an activation key from the web server for the selected optional function.

Therefore, a user is not required to input identification information on an optional function and the image forming apparatus, and immediately carries out activation. Thus, a user can carry out activation without reading a manual or the like to identify the identification information on an optional function and the image forming apparatus.

Further, any of the aforementioned image forming apparatuses according to the first aspect may be as follows. The web browser may transmit the identification information on the selected optional function and the identification information on this image forming apparatus to the web server, and may acquire an activation key from the web server. This activation key is generated corresponding to the identification information on the selected optional function and the identification information on this image forming apparatus.

Further, any of the aforementioned image forming apparatuses according to the first aspect may be as follows. If a program to realize the optional function to be activated has not been installed, then the activating unit may download and install the program.

Therefore, even if a program to realize the optional function to be activated has not been installed, the optional function becomes available without additional user operations.

A key management server machine according to the first aspect of this invention has: an activation key generating unit that generates an activation key corresponding to an optional function of an image forming apparatus; and a web server that receives identification information on the image forming apparatus and identification information on the optional function, and transmits an activation key to the image forming apparatus. This activation key is corresponding to an optional function specified by the identification information on the optional function.

Therefore, the image forming apparatus directly acquires an activation key from the web server by a web browser without any physical media such as USB memory product, and consequently, activation is performed at low costs. Further, since a web browser is available in the image forming apparatus, it is possible to easily produce a user interface used for the activation.

Further, the aforementioned key management server machine according to the first aspect may be as follows. The activation key generating unit may generate an activation key unique to a combination of the image forming apparatus and the optional function. The web server may receive the identification information on the image forming apparatus and the identification information on the optional function, and may transmit the generated activation key to a web browser of the image forming apparatus.

An activation system according to the first aspect of this invention has: any of the image forming apparatuses according to the first aspect; and any of the key management server machines according to the first aspect.

Therefore, the image forming apparatus directly acquires an activation key from the web server by a web browser without any physical media such as USB memory product, and consequently, activation is performed at low costs. Further, by means of the web browser, it is possible to easily produce a user interface used for the activation.

An image forming apparatus according to the second aspect of this invention has: a network communication unit capable of communicating with a web server via a network; a web browser that accesses one of URLs of the web server via communication by the network communication unit, and acquires an activation key from the web server, ones of the URLs corresponding to respective optional functions; and an activating unit that activates an optional function with the activation key acquired by the web browser.

Therefore, the image forming apparatus directly acquires an activation key from a web server by the web browser without any physical media such as USB memory product, and consequently, activation is performed at low costs. Further, by means of the web browser, it is possible to easily produce a user interface used for the activation. Furthermore, it is unnecessary to transmit data other than URL to identify an optional function to be activated.

Further, the aforementioned image forming apparatus according to the second aspect may be as follows. Each of the URLs may contain either a domain name or an IP address unique to each of the optional functions.

Further, any of the aforementioned image forming apparatuses according to the second aspect may be as follows. Each of the URLs may contain a path unique to each of the optional functions.

Further, any of the aforementioned image forming apparatuses according to the second aspect may be as follows. Each of the URLs may contain a URL parameter unique to each of the optional functions.

Further, any of the aforementioned image forming apparatuses according to the second aspect may be as follows. The activation key may be generated according to identification information on this image forming apparatus. The URL may contain the identification information as a URL parameter.

Therefore, it is unnecessary to transmit other data to identify identification information on an image forming apparatus that requests activation.

A key management server machine according to the second aspect of this invention has: an activation key generating unit that generates an activation key corresponding to an optional function of an image forming apparatus; and a web server that receives an activation key issue request transmitted from the image forming apparatus to an URL corresponding to an optional function to be activated, and transmits an activation key to the image forming apparatus. This activation key is corresponding to an optional function specified by the URL.

Therefore, the image forming apparatus directly acquires an activation key from the web server by a web browser without any physical media such as USB memory product, and consequently, activation is performed at low costs. Further, since a web browser is available in the image forming apparatus, it is possible to easily produce a user interface used for the activation. Furthermore, it is unnecessary to receive data other than URL to identify an optional function to be activated.

Further, the aforementioned key management server machine according to the first aspect may be as follows. The web server may receive identification information on the image forming apparatus with the activation key issue request. The activation key generating unit may generate an activation key unique to a combination of the image forming apparatus specified by the identification information and an optional function specified by the URL.

Further, any of the aforementioned key management server machines according to the first aspect may be as follows. The URL may contain either a domain name or an IP address unique to the optional function.

Further, any of the aforementioned key management server machines according to the first aspect may be as follows. The URL may contain a path unique to the optional function.

Further, any of the aforementioned key management server machines according to the first aspect may be as follows. The URL may contain a URL parameter unique to the optional function.

Further, any of the aforementioned key management server machines according to the first aspect may be as follows. The activation key may be generated according to identification information on this image forming apparatus. The URL may contain the identification information as a URL parameter.

Therefore, it is unnecessary to receive other data to identify identification information on an image forming apparatus that requests activation.

An activation system according to the second aspect of this invention has: any of the image forming apparatuses according to the second aspect; and any of the key management server machines according to the second aspect.

Therefore, the image forming apparatus directly acquires an activation key from a web server in the key management server machine by a web browser without any physical media such as USB memory product, and consequently, activation is performed at low costs. Further, by means of the web browser, it is possible to easily produce a user interface used for the activation.

Furthermore, it is unnecessary to transmit and receive data other than URL to identify an optional function to be activated.

An image forming apparatus according to the third aspect of this invention has: a network communication unit capable of communicating with a web server via a network; a web browser that accesses the web server via communication by the network communication unit, and acquires a deactivation key from the web server; and a deactivating unit that deactivates an optional function with the deactivation key.

Therefore, the image forming apparatus directly acquires a deactivation key from a web server by the web browser without any physical media such as USB memory product, and consequently, deactivation is performed at low costs, and an illegal use of an optional function is prevented after deactivation of the optional function.

Further, the aforementioned image forming apparatuses according to the third aspect may be as follows. The image forming apparatus may have: a display unit that displays information to a user; and an input unit that receives a user operation. The web browser may cause the display unit to display a list of one or more optional functions, and may acquire a deactivation key for an optional function selected from the list by the user operation.

Therefore, by means of the web browser, it is possible to easily produce a user interface used for the deactivation.

Further, any of the aforementioned image forming apparatuses according to the third aspect may be as follows. The web browser may cause the display unit to display the list according to web-page data that contains a list of one or more optional functions.

Further, any of the aforementioned image forming apparatuses according to the third aspect may be as follows. The image forming apparatus may have a storage unit that stores identification information on an optional function and identification information on this image forming apparatus. The web browser may read out the identification information on the optional function from the storage unit, and may cause the display unit to display the identification information on the optional function, and if the input unit receives the predetermined user operation, the web browser may acquire a deactivation key from the web server for the optional function identified by the identification information.

Therefore, a user is not required to input identification information on an optional function and the image forming apparatus, and immediately carries out deactivation. Thus, a user can carry out deactivation without reading a manual or the like to identify the identification information on an optional function and the image forming apparatus.

Further, any of the aforementioned image forming apparatuses according to the third aspect may be as follows. The image forming apparatus may have a storage unit that stores identification information on an optional function and identification information on this image forming apparatus. The web browser may transmit the identification information on the optional function and the identification information on this image forming apparatus to the web server, and may acquire a deactivation key generated corresponding to the identification information on the selected optional function and the identification information on this image forming apparatus.

Further, any of the aforementioned image forming apparatuses according to the third aspect may be as follows. The image forming apparatus may have a storage unit that stores identification information on an optional function and an activation key of the optional function. The web browser may transmit the activation key to the web server, and may acquire a deactivation key generated corresponding to the activation key.

Further, any of the aforementioned image forming apparatuses according to the third aspect may be as follows. The image forming apparatus may have a deactivation key verifying unit that verifies the acquired deactivation key of an optional function with either an activation key of the optional function or a combination of identification information on the optional function and identification information on this image forming apparatus. The deactivating unit may deactivate the optional function only if the acquired deactivation key of the optional function is verified as proper.

Therefore, it is prevented to make incorrect deactivation.

A key management server machine according to the third aspect of this invention has: a deactivation key generating unit that generates a deactivation key corresponding to an optional function of an image forming apparatus; and a web server that receives identification information on the image forming apparatus and identification information on the optional function, and transmits a deactivation key to the image forming apparatus. This deactivation key is corresponding to an optional function specified by the identification information on the optional function.

Therefore, the image forming apparatus directly acquires a deactivation key from the web server by a web browser without any physical media such as USB memory product, and consequently, deactivation is performed at low costs, and an illegal use of an optional function is prevented after deactivation of the optional function.

Further, the aforementioned key management server machine according to the third aspect may be as follows. The deactivation key generating unit may generate a deactivation key unique to a combination of the image forming apparatus and the optional function. The web server may receive the identification information on the image forming apparatus and the identification information on the optional function, and may transmit the generated deactivation key to a web browser of the image forming apparatus.

Further, any of the aforementioned key management server machines according to the third aspect may be as follows. The deactivation key generating unit may generate a deactivation key unique to an activation key. The web server may receive an activation key from a web browser of the image forming apparatus, and may transmit a deactivation key to the web browser, and the deactivation key is generated by the deactivation key generating unit from the received activation key.

An activation system according to the third aspect of this invention has: any of the image forming apparatuses according to the third aspect; and any of the key management server machines according to the third aspect.

Therefore, the image forming apparatus directly acquires a deactivation key from a web server in the key management server machine by a web browser without any physical media such as USB memory product, and consequently, deactivation is performed at low costs, and an illegal use of an optional function is prevented after deactivation of the optional function.

A key management server machine according to the fourth aspect of this invention has: an activation key generating unit that generates an activation key corresponding to an optional function of an image forming apparatus; a deactivation key generating unit that generates a deactivation key companion to the activation key; a web server that issues the activation key to the image forming apparatus to activate the optional function, and issues the deactivation key companion to the activation key to the image forming apparatus to deactivate the optional function; and a storage unit that stores activation key issue information when an optional function of the image forming apparatus has been activated, and stores deactivation completion information when the optional function that has been activated is deactivated. This activation key issue information indicates the optional function of the image forming apparatus has been activated, and this deactivation completion information indicates the optional function that had been activated was deactivated.

Therefore, the image forming apparatus directly acquires a deactivation key from the web server by a web browser without any physical media such as USB memory product, and consequently, deactivation is performed at low costs, and an illegal use of an optional function is prevented after deactivation of the optional function.

Further, the aforementioned key management server machine according to the fourth aspect may be as follows. When the activation key generating unit re-generates an activation key for an optional function indicated by the deactivation completion information, the activation key generating unit generates an activation key different from all activation keys that were generated before for the optional function.

Therefore, the activation key is changed after deactivation. Even if the activation key would be illegally identified, the old activation key is not available to illegally use an optional function after deactivation of the activation key.

Further, any of the aforementioned key management server machines according to the fourth aspect may be as follows. The deactivation completion information may be stored by the storage unit after a notification of finished deactivation is received from the image forming apparatus that received the deactivation key.

Since the server machine directly receives a notification of finished deactivation from the image forming apparatus that performed deactivation, the server machine surely detects that the optional function becomes unavailable in the image forming apparatus.

Further, any of the aforementioned key management server machines according to the fourth aspect may be as follows. The activation key generating unit may generate an activation key unique to a combination of the image forming apparatus and the optional function.

Further, any of the aforementioned key management server machines according to the fourth aspect may be as follows. When the deactivation key generating unit generates a deactivation key of an optional function, the deactivation key generating unit may generate a deactivation key unique to a combination of the image forming apparatus and the optional function.

Further, any of the aforementioned key management server machines according to the fourth aspect may be as follows. When the deactivation key generating unit generates a deactivation key of an optional function, the deactivation key generating unit may generate a deactivation key corresponding to an activation key generated for the optional function.

An activation system according to the fifth aspect of this invention has: an image forming apparatus; an application server; a database server; and a web server. The image forming apparatus, the application server, the database server and the web server are capable of communicating with each other. The image forming apparatus comprises a web browser, and transmits identification information on the image forming apparatus and identification information on an optional function to the web server by the web browser, and receives an activation key for the optional function by the web browser, and activates the optional function with the activation key. On the other hand, the server side performs processes as follows. (a) The application server receives identification information on the image forming apparatus and identification information on an optional function from the web server, and generates an activation key for the optional function, and transmits the activation key to the web server. (b) The web server receives the identification information on the image forming apparatus and the identification information on the optional function, and transfers the identification information on the image forming apparatus and the identification information on the optional function to the application server, and receives the activation key from the application server, and transmits the activation key to the web browser of the image forming apparatus. (c) The database server maintains activation key issue information after the web server transmits the activation key, and the activation key issue information indicates that the activation key is issued for the optional function of the image forming apparatus.

Therefore, the image forming apparatus directly acquires an activation key from the web server by the web browser without any physical media such as USB memory product, and consequently, activation is performed at low costs. Further, by means of the web browser, it is possible to easily produce a user interface used for the activation. Furthermore, since the server side (i.e. a set of servers) is divided into the web server, the application server and the database server, the servers can be individually connected to either a network or different networks.

Further, the aforementioned activation system according to the fifth aspect may be as follows. The image forming apparatus may transmit identification information on the image forming apparatus and identification information on an optional function to the web server by the web browser, and may receive a deactivation key for the optional function by the web browser, and deactivates the optional function with the deactivation key. On the other hand, the server side may perform processes as follows. (a) The application server may receive identification information on the image forming apparatus and identification information on an optional function from the web server, and may generate a deactivation key for the optional function, and may transmit the deactivation key to the web server. (b) The web server may receive the identification information on the image forming apparatus and the identification information on the optional function from the web browser of the image forming apparatus, and may transfer the identification information on the image forming apparatus and the identification information on the optional function to the application server, and may receive the deactivation key from the application server, and may transmit the deactivation key to the web browser of the image forming apparatus. (c) The database server may maintain deactivation completion information associated with the activation key issue information. The deactivation completion information indicates that the optional function that had been activated in the image forming apparatus was deactivated.

Therefore, since deactivation is administrated by the server side, it is prevented to use an optional function after deactivation of the optional function.

Further, any of the aforementioned activation systems according to the fifth aspect may be as follows. The image forming apparatus may be connected to a local network connected via a gateway to Internet; and the application server, the database server and the web server may be connected to Internet.

Further, any of the aforementioned activation systems according to the fifth aspect may be as follows. The image forming apparatus may be connected to a local network connected via a gateway to another local network; and the application server, the database server and the web server may be connected to the another local network.

Further, any of the aforementioned activation systems according to the fifth aspect may be as follows. The image forming apparatus may be connected to a local network connected via a gateway to another local network; and the application server and the database server may be connected to the local network that the image forming apparatus is connected to; and the web server may be connected to the another local network.

Further, any of the aforementioned activation systems according to the fifth aspect may be as follows. The another local network may be a network other than Internet.

These and other objects, features and advantages of the present invention will become more apparent upon reading of the following detailed description along with the accompanied drawings.

BRIEF DESCRIPTION OF THE DRAWINGS

FIG. 3 shows a diagram that indicates an instance of an optional function table in FIG. 2;

FIG. 5 shows a diagram that indicates an instance of an activation management table in FIG. 4;

DETAILED DESCRIPTION OF THE PREFERRED EMBODIMENT

Hereinafter, embodiments according to aspects of the present invention will be explained with reference to drawings.

Embodiment 1

Figure 1:
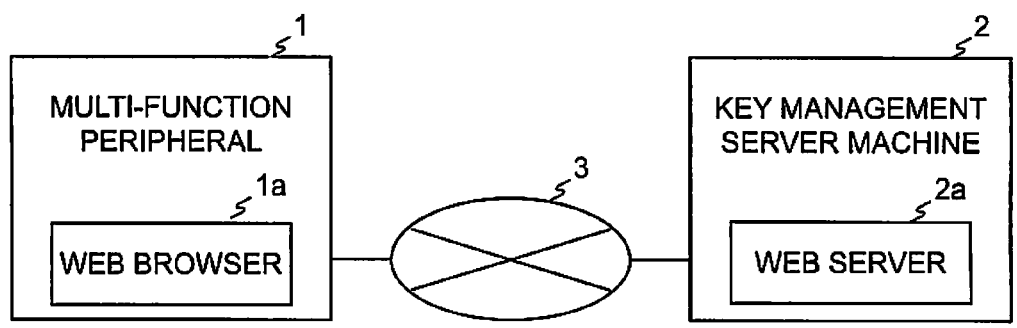
FIG. 1 shows a block diagram that indicates a configuration of an activation-deactivation system according to Embodiment 1 of this invention.

FIG. 1 shows a block diagram that indicates a configuration of an activation-deactivation system according to Embodiment 1 of this invention. In the system shown in FIG. 1, a multi-function peripheral 1 and a key management server machine 2 are capable of communicating via a network 3 with each other. In the multi-function peripheral 1, a web browser 1a runs, and in the key management server machine 2, a web server 2a runs. Communication between the multi-function peripheral 1 and the key management server machine 2 is performed between the web browser 1a and the web server 2a according to HTTP (Hypertext Transfer Protocol).

The multi-function peripheral 1 is an instance of the image forming apparatus, and has a printing function, a scanning function, a copying function, a facsimile transmitting-receiving function, and so on. The multi-function peripheral 1 has at least one optional function other than standard functions. The optional function is a function that becomes available by activation. The standard functions are functions available without activation. For the optional function, necessary hardware (e.g. an extension board) and necessary software (that is, a program) have been installed in the multi-function peripheral 1, but a user is not allowed to use the optional function before activation. A user is allowed to use the optional function after activation. In addition, if deactivation is performed for the optional function after activation, then a user is prohibited again from using the optional function.

The optional function may be, for instance, a high level security function, a PDF optional function, or an Internet facsimile function. The high level security function automatically deletes data generated for printing and copying after the printing and the copying. The PDF optional function reduces a file size of a generated PDF file, and encrypts the generated PDF file with a password. The Internet facsimile function transmits and receives emails via Internet. The emails contain image data generated by scanning a document.

The multi-function peripheral 1 acquires an activation key necessary to activation from the key management server machine 2 by the web browser 1a, and performs the activation if the activation key is valid. After the activation, an optional function activated with the activation key becomes available to a user.

On the other hand, the key management server machine 2 issues activation keys and deactivation keys, and maintains activation status information and the number of times of activation on one or more optional functions of the multi-function peripheral 1. The activation status information indicates one of statuses: "not activated", "activated", and "deactivated". The number of times of activation is the number of times of issuing an activation key to an identical optional function of the multi-function peripheral 1. The key management server machines 2 receives an activation key issue request or a deactivation key issue request from the multi-function peripheral 1 by the web server 2a, and generates an activation key or a deactivation key for an optional function specified by the activation key issue request or the deactivation key issue request, and transmits the activation key or the deactivation key to the multi-function peripheral 1.

Figure 2:
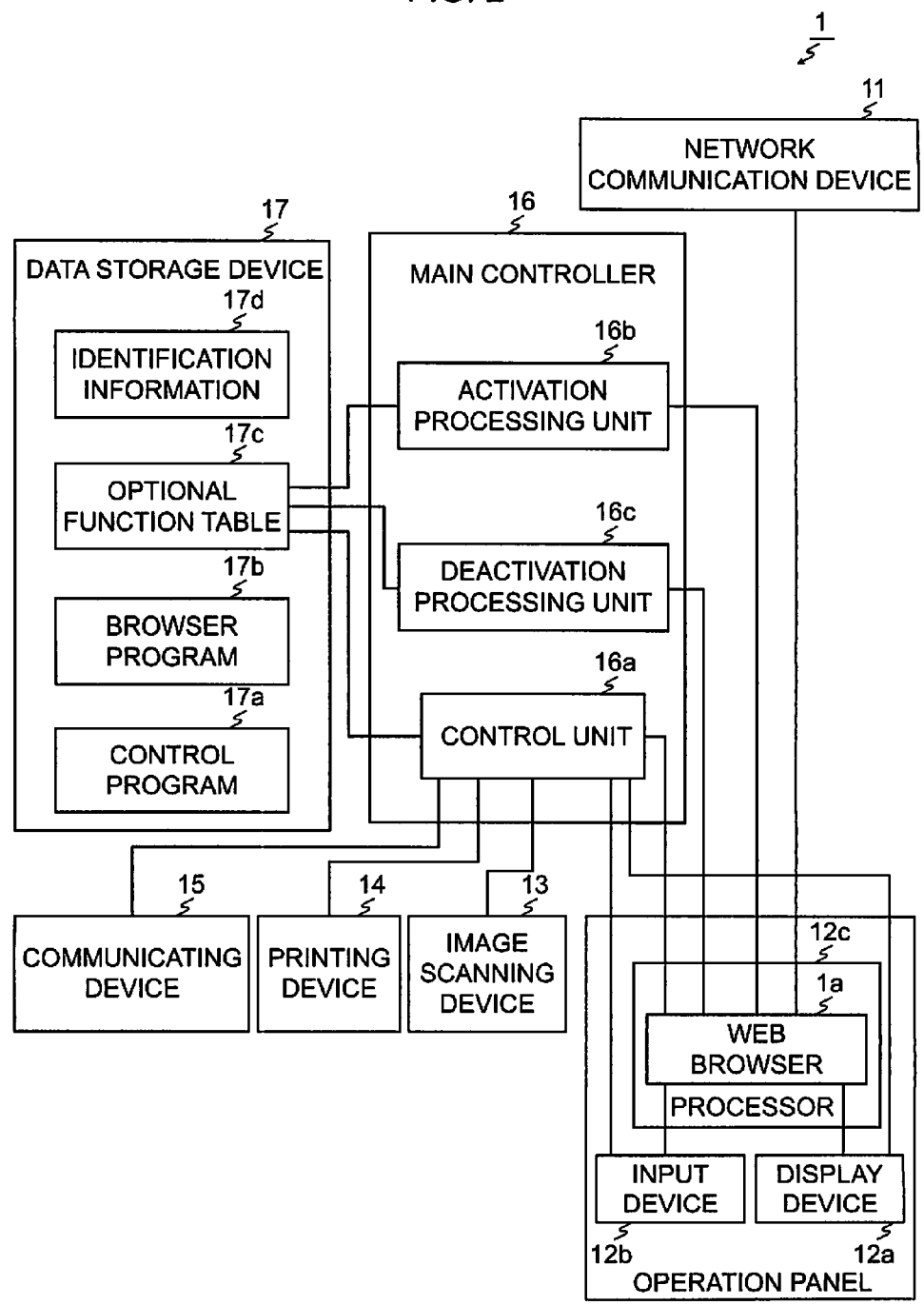
FIG. 2 shows a block diagram that indicates a configuration of a multi-function peripheral in FIG. 1.

FIG. 2 shows a block diagram that indicates a configuration of a multi-function peripheral 1 in FIG. 1. In FIG. 2, a network communication device 11 is capable of connecting the network 3, and communicates with the key management server machine 2 via the network 3. The network communication device 11 may be a network interface card, or the like.

An operation panel 12 is placed on a housing of the multi-function peripheral 1, and contains a display device 12a that displays information to a user, an input device 12b that receives a user operation, and a processor 12c. The display device 12a may be a crystal liquid display. The input device 12b may be key switches, and a touch panel placed on a screen of the display device 12a. The processor 12c contains a CPU (Central Processing Unit), a RAM (Random Access Memory), a ROM (Read Only Memory) and so on (not shown), and realizes processing units by loading a program to the RAM and executing the program. The processor 12c realizes the web browser 1a by executing a browser program 17b.

The web browser 1a is a processing unit that has an HTTP client function and a web-page data execution function. The HTTP client function controls the network communication device 11 and communicates according to HTTP. The web-page data execution function parses web-page data described in HTML (Hypertext Markup Language), Javascript™, and so on, and causes to display a screen according to the web-page data, and controls communication with the HTTP client function. Further, for activation, the web browser 1a accesses the web server 2a via communication by the network communication device 11, and acquires an activation key from the web server 2; and for deactivation, the web browser 1a accesses the web server 2a via communication by the network communication device 11, and acquires a deactivation key from the web server 2.

If the web server 2a can receive activation key issue requests at URLs (Uniform Resource Locators) corresponding to respective optional functions, then the web browser 1a may access the web server 2a at a URL corresponding to an optional function to be activated, and may acquire an activation key for the optional function from the web server 2a. The web server 2a may identify the optional function to be activated from the URL at which the activation key issue request is received.

An image scanning device 13 is a device that realizes the scanning function, and scans a document image and outputs image data of the document image. A printing device 14 is a device that realizes the printing function, and forms an image based on print data, and prints the image on a print sheet. A communicating device 15 is a device that realizes facsimile transmitting-receiving function, and transmits and receives facsimile signals by a modem, and converts one to another between the facsimile signals and image data.

A main controller 16 has a computer (not shown) that contains a CPU, a RAM, a ROM and so on, and realizes processing units by loading a program to the RAM and executing the program. The main controller 16 realizes a control unit 16a, an activation processing unit 16b, and a deactivation processing unit 16c by executing a control program 17a.

The control unit 16a is a processing unit that controls the web browser 1a, the network communication device 11, the operation panel 12, the image scanning device 13, the printing device 14, and the communicating device 15. The control unit 16a refers to activation status information in an optional function table 17c, and allows a user to use an optional function if the value of the activation status information on the optional function indicates "activated", and otherwise (if "not activated" or "deactivated"), prohibits a user from using the optional function.

The activation processing unit 16b is a processing unit that activates an optional function with the activation key acquired by the web browser 1a. The activation processing unit 16b determines whether or not the activation key acquired by the web browser 1a is valid. Only if the activation key is valid, the activation processing unit 16b updates the optional function table 17c to allow a user to use the optional function for which the activation key is issued.

The deactivation processing unit 16c is a processing unit that deactivates an optional function with the deactivation key acquired by the web browser 1a. The deactivation processing unit 16c determines whether or not the deactivation key acquired by the web browser 1a is valid. Only if the deactivation key is valid, the deactivation processing unit 16c updates the optional function table 17c to prohibit a user from using the optional function for which the deactivation key is issued.

A data storage device 17 stores the control program 17a, the browser program 17b, the optional function table 17c, and identification information 17d. The data storage device 17 may be a non-volatile storage device such as hard disc drive or non-volatile memory. The control program 17a and the browser program 17b may be a non-volatile memory (not shown) in the main controller 16 rather than the data storage device 17.

The optional function table 17c is a table that contains an optional function code (as identification information on an optional function), and activation status information on the optional function associated with the optional function code. FIG. 3 shows a diagram that indicates an instance of the optional function table 17c in FIG. 2. In the instance shown in FIG. 3, an optional function of the optional function code "1001" has not been activated, and is not available; and an optional function of the optional function code "1002" has been activated, and is available.

The identification information 17d is ID data (e.g. a serial number) unique to this multi-function peripheral 1. Therefore, if there are two or more multi-function peripherals, each of the multi-function peripherals has identification information 17d different from that of any other multi-function peripheral.

Figure 4:
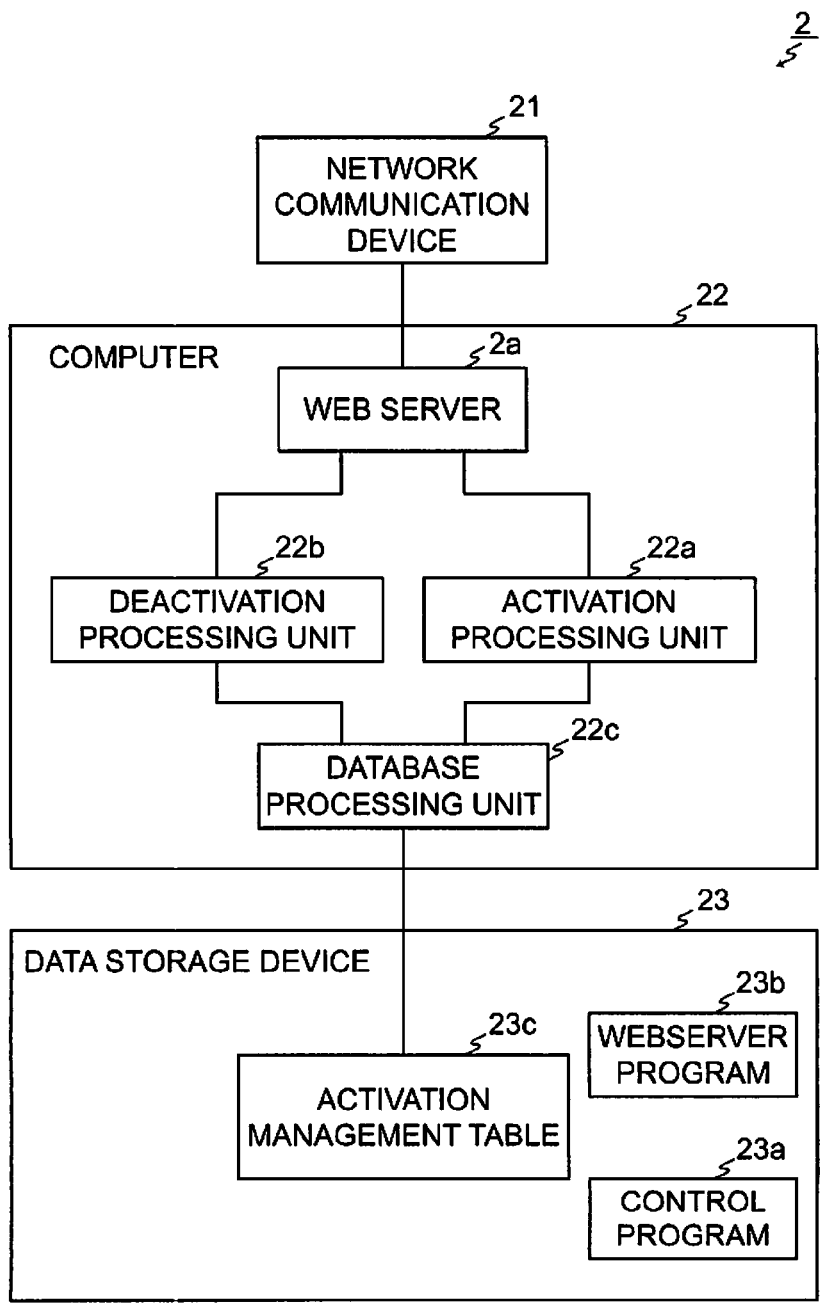
FIG. 4 shows a block diagram that indicates a configuration of a key management server machine in FIG. 1.

FIG. 4 shows a block diagram that indicates a configuration of a key management server machine 2 in FIG. 1. In FIG. 4, a network communication device 21 is capable of connecting the network 3, and communicates with the multi-function peripheral 1 via the network 3. The network communication device 21 may be a network interface card, or the like.

The computer 22 has a CPU, a RAM, a ROM and other components, and is a device that loads a program to the RAM and executes the program with the CPU in order to realize processing units. The computer 22 realizes an activation processing unit 22a, a deactivation processing unit 22b, and a database processing unit 22c by executing a control program 23a, and realizes the web server 2a by executing a web-server program 23b.

The web server 2a is a processing unit that has an HTTP server function. The HTTP server function controls network communication device 21, and communicates according to HTTP. The web server 2a receives an activation key issue request from the web browser 1a, and transmits an activation key to the web browser 1a. This activation key is generated by the activation processing unit 22a. Further, the web server 2a receives a deactivation key issue request from the web browser 1a, and transmits a deactivation key to the web browser 1a. This deactivation key is generated by the deactivation processing unit 22b.

The web server 2a may receive identification information on the multi-function peripheral 1 and identification information on an optional function, and may transmit an activation key corresponding to an optional function specified by the identification information on the optional function. This activation key may also be transmitted to the web browser 1a of the multi-function peripheral 1.

Alternatively, the web server 2a may receive an activation key issue request from the multi-function peripheral 1 to an URL corresponding to an optional function to be activated, and may transmit an activation key corresponding to an optional function specified by the URL. This activation key may also be transmitted to the web browser 1a of the multi-function peripheral 1.

The activation processing unit 22a is a processing unit that performs: (a) determination of whether issue of an activation key should be allowed or not, (b) generating an activation key, (c) registering activation key issue information to the activation management table 23c, and so on.

In this embodiment, the activation processing unit 22a generates an activation key with a predetermined function or formula which argument contains identification information on the multi-function peripheral 1 and identification information on an optional function to be activated.

The deactivation processing unit 22b is a processing unit that performs: (a) determination of whether issue of a deactivation key should be allowed or not, (b) generating a deactivation key, (c) detecting completion of deactivation, (d) registering deactivation completion information to the activation management table 23c, and so on.

In this embodiment, the deactivation processing unit 22b generates a deactivation key with a predetermined function or formula which argument contains identification information on the multi-function peripheral 1 and identification information on an optional function to be deactivated. Alternatively, the deactivation processing unit 22b may generate a deactivation key with a predetermined function or formula which argument contains an issued activation key. In one of the aforementioned methods, the deactivation processing unit 22b generates a deactivation key companion to the activation key in one-to-one correspondence.

The database processing unit 22c is a processing unit that receives a command, and reads or writes data on the activation management table 23c according to the command. For example, this command may be a SQL (Structured Query Language) command.

A data storage device 23 stores the control program 23a, the web-server program 23b, and the activation management table 23c. The data storage device 23 may be a non-volatile storage device such as hard disc drive or non-volatile memory. Alternatively, the activation management table 23c may be stored in another data storage device.

The activation management table 23c maintains activation status information on respective optional functions of respective multi-function peripherals (here, the multi-function peripheral 1). The activation management table 23c contains: (a) user ID of a user who carries out activation or deactivation, (b) MFP ID as identification information on the multi-function peripheral in which the activation or the deactivation is carried out, (c) an optional function code as identification information on the activated or deactivated optional function, and (d) activation status information, that are associated with each other. FIG. 5 shows a diagram that indicates an instance of the activation management table 23c in FIG. 4. Information on optional functions that has not been activated is not registered in the activation management table 23c shown in FIG. 5. Alternatively, information on optional functions that has not been activated may be registered in the activation management table 23c. Further, an issued activation key is not registered in the activation management table 23c shown in FIG. 5. Alternatively, an issued activation key of each activation may also be registered in the activation management table 23c.

Figure 6:
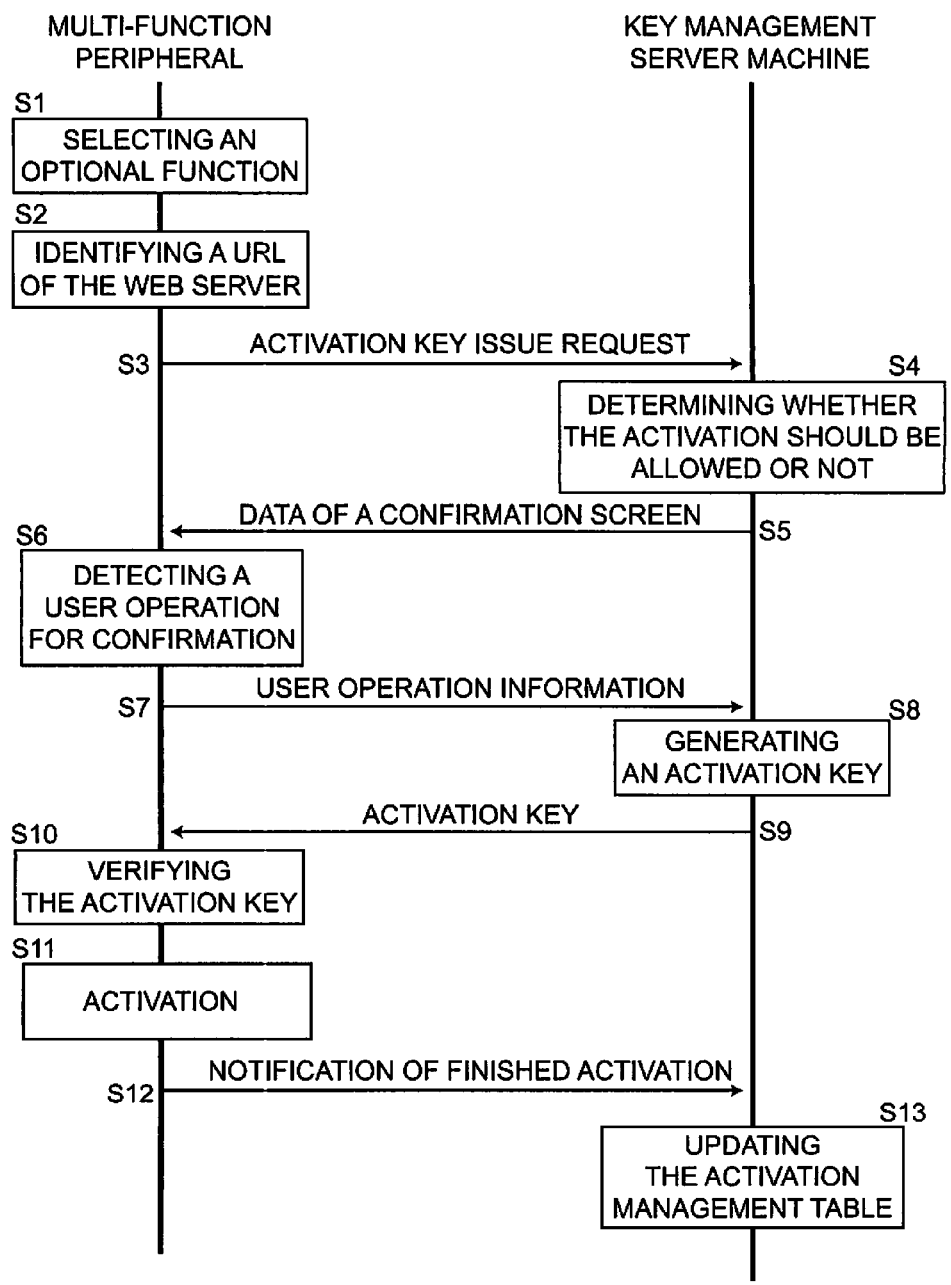
FIG. 6 shows a diagram for explaining an activation process for an optional function of the multi-function peripheral in the system shown in FIG. 1.

In the following part, operations of the apparatus 1 and the machine 2 in this system are explained.
(1) Activation for an Optional Function FIG. 6 shows a diagram for explaining an activation process for an optional function of the multi-function peripheral 1 in the system shown in FIG. 1.

A user inputs a user operation to the input device 12b of the multi-function peripheral 1 for starting activation. The control unit 16a detects the user operation, and causes the web browser 1a to perform selection of an optional function to be activated (Step S1).

Specifically, the web browser 1a of the multi-function peripheral 1 refers to the optional function table 17c, and then generates web-page data of a list of optional functions registered in the table 17c, and causes the display device 12a to display the list based on the web-page data. The list of optional functions contains a set of an optional function code, an optional function name and current activation status information for each of optional functions. While the list is displayed, if a user operation to select an optional function in the list is input to the input device 12b, then the web browser 1a detects the user operation, and identifies an optional function selected by the user operation.

The web browser 1a identifies a URL of the web server 2a of the key management server machine 2 to which an activation key issue request is transmitted (Step S2).

Specifically, the web browser 1a causes the display device 12a to display a screen to prompt a user to input the URL. The screen contains an input field of the URL, and is displayed according to a predetermined web-page data. If a user operation of the URL is input to the input device 12b after starting to display the screen, the web browser 1a detects the operation, and identifies the input URL. The web browser 1a determines that the URL is an address to which an activation key issue request is transmitted.

Alternatively, the web browser 1a may determine that a predetermined URL stored in the data storage device 17 is an address to which an activation key issue request is transmitted.

Alternatively, the web browser 1a may determine that a URL specified in advance for the selected optional function is an address to which an activation key issue request is transmitted. Specifically, a URL corresponding to an optional function code may have been stored in the optional function table 17c, and the web browser 1a may refer to the optional function table 17c, and may identify a URL corresponding to the selected optional function as the address. Alternatively, the web browser 1a may generate a URL as the address from an optional function code of the selected optional function. For example, the web browser 1a can generate the URL by combining a predetermined string and a string of the optional function code.

The URL, as an address to which an activation key issue request is transmitted, may contain either a domain name or an IP address unique to an optional function. Further, the URL may contain a path unique to an optional function. Furthermore, the URL may contain a URL parameter unique to an optional function. For example, the URL "http://www.xxx.co.jp/a/key.cgi?code=1001" contains the domain name "www.xxx.co.jp", the path "a/key.cgi", and the URL parameter "code=1001".

The web browser 1a transmits an activation key issue request to the URL as the address (Step S3). For example, the web browser 1a transmits a file indicating an activation key issue request to the URL by a POST command of HTTP. The file contains identification information on the multi-function peripheral 1 (i.e. MFP ID) and an optional function code of the selected optional function. Alternatively, the optional function code may not be contained in the file, and may be contained in a URL parameter. Alternatively, if a URL assigned to an optional function is used as the address, then the web browser 1a may include MFP ID and an optional function code in one or more URL parameters of the URL, and may transmit an HTTP command to the URL.

In the key management server machine 2a, the web server 2a receives the activation key issue request transmitted to the URL. After the web server 2a is started, the web server 2a waits for an HTTP command to a URL assigned to the web server 2a, and receives an HTTP command if the HTTP command is transmitted to the URL. Here, the URL may be a URL of a CGI (Common Gateway Interface), and when the activation key issue request is received, the CGI may be started and may receive a file of the request. Alternatively, a file of the request may be stored in a folder specified by a path of the URL.

If the web server 2a receives the activation key issue request, then the activation processing unit 22a refers to either the file of the request or the URL parameter to identify MFP ID and an optional function code received with the request, and identifies the MFP ID and the optional function code from the file or the URL parameter. The activation processing unit 22a determines whether an activation key corresponding to the MFP ID and the optional function code should be issued or not (Step S4).

Specifically, for instance, the activation processing unit 22a determines whether the value of the MFP ID and the value of the optional function code are valid or not. In other words, it is determined whether there is any multi-function peripheral corresponding to the value of the MFP ID and there is any optional function corresponding to the value of the optional function code.

If the activation processing unit 22a determines that an activation key should not be issued, then the activation processing unit 22a does not issue an activation key, and ends a process for the activation key issue request.

If the activation processing unit 22a determines that an activation key should be issued, then the web server 2a transmits web-page data of a confirmation screen before activation to the web browser 1a of the multi-function peripheral 1 (Step S5).

Figure 7:
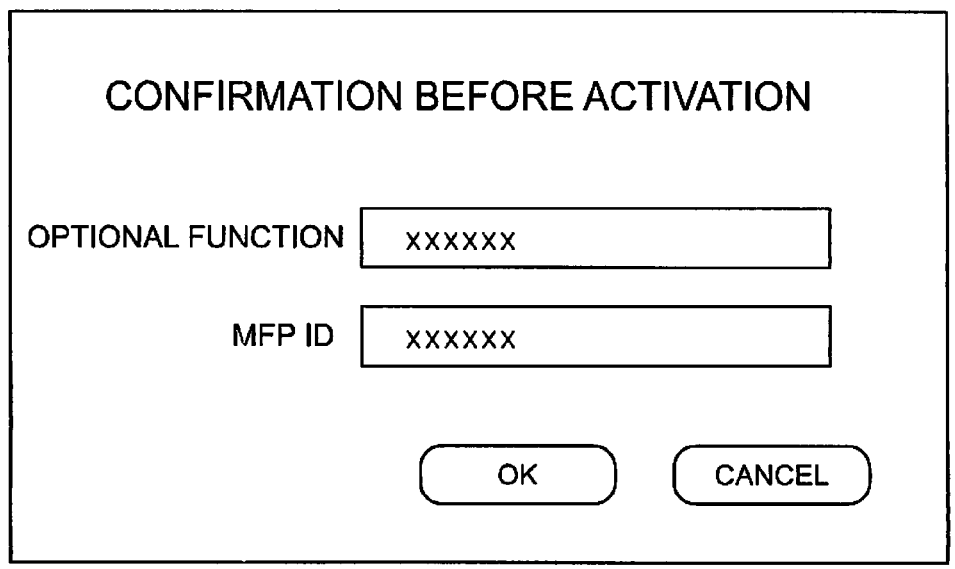
FIG. 7 shows a diagram that indicates an instance of a screen for confirmation before activation.

The web browser 1a of the multi-function peripheral 1 receives the web-page data, and causes the display device 12 to display a screen for confirmation before activation based on the web-page data. FIG. 7 shows a diagram that indicates an instance of a screen for confirmation before activation. As shown in FIG. 7, on the screen, a name of the optional function or the optional function code, the MFP ID, and an OK button are displayed for receiving a user operation for confirmation.

While the screen is displayed, if a user operation to push down the OK button for confirmation is input to the input device 12b, then the web browser 1a detects the user operation, and transmits information on the user operation to the web server 2a of the key management server machine 2 (Step S7).

In the key management server machine 2, if the web server 2a receives the information on the user operation, then the activation processing unit 22a generates an activation key (Step S8). The activation key is generated from the MFP ID and the optional function code received from the multi-function peripheral 1. For instance, the MFP ID and the optional function code are set as arguments of a function, and the value of the function is calculated as the activation key. If each of URLs has been specified for each of optional functions, then an optional function code of an optional function to be activated is identified from the URL at which the activation key issue request is received. Here, the activation processing unit 22a may refer to the activation management table 23c, and may not issue an activation key if the number of times of activation for the optional function of the multi-function peripheral is equal to or greater than a predetermined value. Thus, the activation processing unit 22a may issue an activation key only if the number of times of activation for the optional function of the multi-function peripheral is less than the predetermined value.

After the activation processing unit 22a generates an activation key, the web server 2a transmits the activation key to the web browser 1a of the multi-function peripheral 1, i.e. the web browser that transmitted the activation key issue request (Step S9).

In the multi-function peripheral 1, the web browser 1a receives the activation key, and the activation processing unit 16b determines whether or not the activation key is valid (Step S10). Specifically, the activation processing unit 16b calculates an activation key from information stored in the data storage device 17 in the same way (e.g. using the same function or formula) as that in the activation processing unit 22a of the key management server 2, and determines whether the calculated activation key is identical to the received activation key or not in order to determine whether the activation key is valid.

If the activation processing unit 16b determines that the activation key is not valid, then the web browser 1a causes the display device 12a to display a screen with a message that the activation is failed.

Otherwise, the activation processing unit 16b determines that the activation key is valid, then the activation processing unit 16b performs activation (Step S11). Specifically, the activation processing unit 16b changes the value of activation status information on an optional function to be activated to the value "activated" in the optional function table 17c. As a result, the optional function becomes available, and the control unit 16a allows a user to use the optional function according to a user request.

After the activation is completed by the activation processing unit 16b, the web browser 1a transmits a notification of finished activation to the web server 2a of the key management server machine 2 (Step S12).

In the key management server machine 2, the web server 2a receives the notification of finished activation, and the activation processing unit 22a updates the activation management table 23c by providing a command to the data processing unit 22c (Step S13). Specifically, for an optional function of a multi-function peripheral that activation is completed, a record of the activation is registered in the activation management table 23c. This record contains MFP ID of the multi-function peripheral, an optional function code of the optional function, activation status information (the value: "activated"), and the number of times of activation. If the record is newly registered in the table 23c, then the number of times of activation is set as "1". If a deactivated optional function was activated again, then the number of times of activation is set as the value calculated by adding "1" to the number of times of activation registered in the table. Specifically, if the multi-function peripheral transmits the MFP ID and a user ID of a user who logs in to the multi-function peripheral when activation is carried out, then the record registered in the table 23c contains the user ID, the MFP ID, the optional function code, the activation status information (the value: "activated"), and the number of times of activation. It should be noted that activation status information with the value "activated" is an instance of the activation key issue information.

As mentioned above, activation for an optional function of the multi-function peripheral 1 is performed.

(2) Deactivation for an Optional Function

Figure 8:
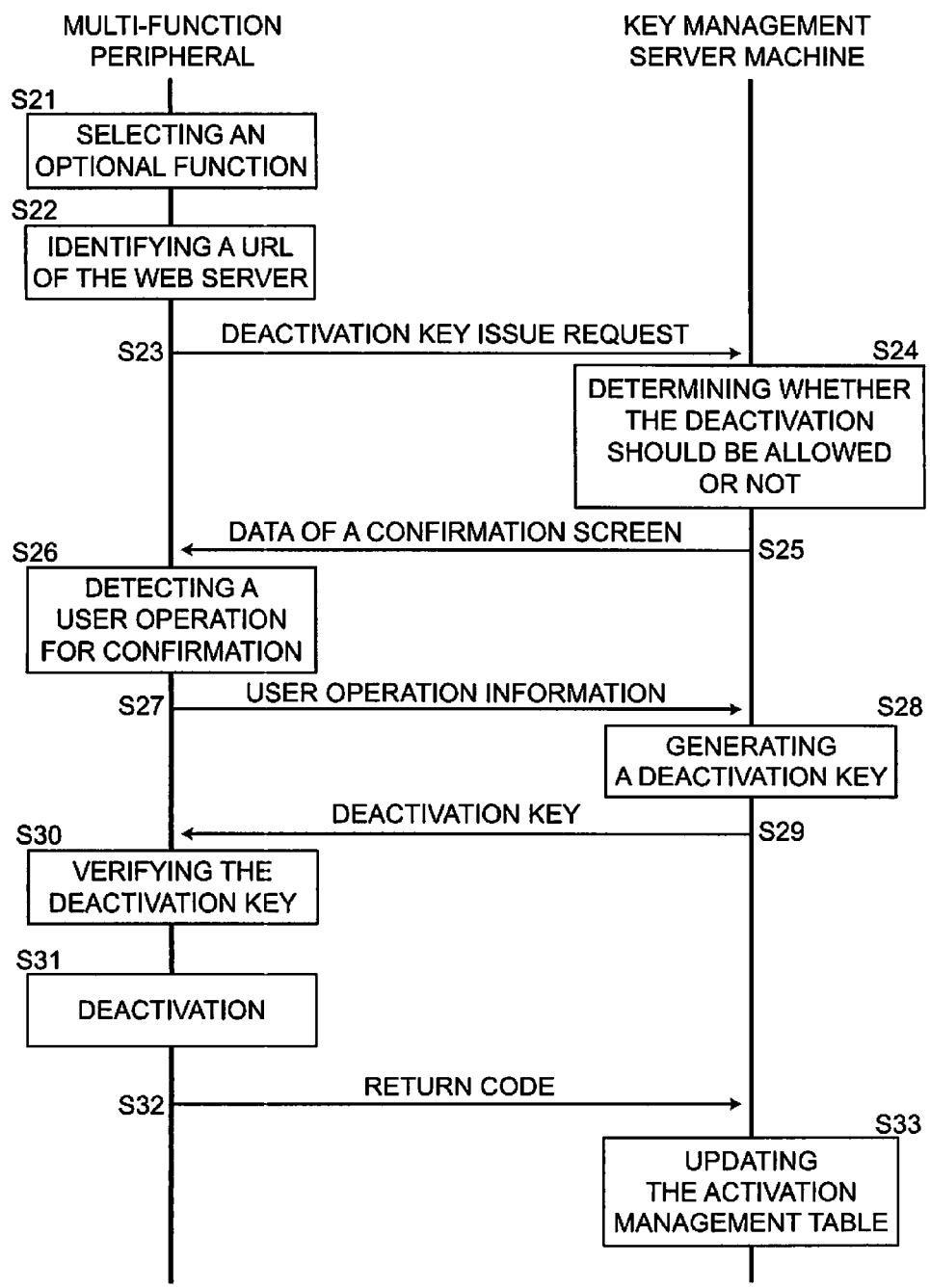
FIG. 8 shows a diagram for explaining a deactivation process for an optional function of the multi-function peripheral in the system shown in FIG. 1.

FIG. 8 shows a diagram for explaining a deactivation process for an optional function of the multi-function peripheral 1 in the system shown in FIG. 1.

If a user operation for deactivation is input to the input device 12b of the multi-function peripheral 1, then the control unit 16a detects the user operation, and performs selection of an optional function to be deactivated (Step S21).

Specifically, the web browser 1a of the multi-function peripheral 1 refers to the optional function table 17c, and then generates web-page data of a list of optional functions registered in the table 17c, and causes the display device 12a to display the list based on the web-page data. The list of optional functions contains a set of an optional function code, an optional function name and current activation status information for each of optional functions. The list to be displayed may contain only one or more activated optional functions in all optional functions registered in the table 17c. After the list is displayed, if a user operation to select an optional function in the list is input to the input device 12b, then the web browser 1a detects the user operation, and identifies an optional function selected by the user operation.

The web browser 1a identifies a URL of the web server 2a of the key management server machine 2 to which a deactivation key issue request is transmitted (Step S22).

Specifically, the web browser 1a causes the display device 12a to display a screen to prompt a user to input the URL. The screen contains an input field of the URL, and is displayed according to a predetermined web-page data. If a user operation of the URL is input to the input device 12b after starting to display the screen, the web browser 1a detects the operation, and identifies the input URL. The web browser 1a determines that the URL is an address to which a deactivation key issue request is transmitted.

Alternatively, the web browser 1a may determine that a predetermined URL stored in the data storage device 17 is an address to which a deactivation key issue request is transmitted.

Alternatively, the web browser 1a may determine that a URL specified in advance for the selected optional function is an address to which a deactivation key issue request is transmitted. Specifically, a URL corresponding to an optional function code may have been stored in the optional function table 17c, and the web browser 1a may refer to the optional function table 17c, and may identify a URL corresponding to the selected optional function as the address. Alternatively, the web browser 1a may generate a URL as the address from an optional function code of the selected optional function. For example, the web browser 1a can generate the URL by combining a predetermined string and a string of the optional function code.

The URL, as an address to which a deactivation key issue request is transmitted, may contain either a domain name or an IP address unique to an optional function. Further, the URL may contain a path unique to an optional function. Furthermore, the URL may contain a URL parameter unique to an optional function.

The URL to which a deactivation key issue request is transmitted for an optional function may be identical to the URL to which an activation key issue request is transmitted for the optional function.

The web browser 1a transmits a deactivation key issue request to the URL as the address (Step S23). For example, the web browser 1a transmits a file indicating a deactivation key issue request to the URL by a POST command of HTTP. The file contains identification information on the multi-function peripheral 1 (i.e. MFP ID) and an optional function code of the selected optional function. Alternatively, the optional function code may not be contained in the file, and may be contained in a URL parameter. Alternatively, if a URL assigned to an optional function is used as the address, then the web browser 1a may include MFP ID and an optional function code in one or more URL parameters of the URL, and may transmit an HTTP command to the URL.

In the key management server machine 2a, the web server 2a receives the deactivation key issue request transmitted to the URL. After the web server 2a is started, the web server 2a waits for an HTTP command to a URL assigned to the web server 2a, and receives an HTTP command if the HTTP command is transmitted to the URL. Here, the URL may be a URL of a CGI, and when the deactivation key issue request is received, the CGI may be started and may receive a file of the request. Alternatively, a file of the request may be stored in a folder specified by a path of the URL.

If the web server 2a receives the deactivation key issue request, then the deactivation processing unit 22b refers to either the file of the request or the URL parameter to identify MFP ID and an optional function code received with the request, and identifies the MFP ID and the optional function code from the file or the URL parameter. The deactivation processing unit 22b determines whether a deactivation key corresponding to the MFP ID and the optional function code should be issued or not (Step S24).

Specifically, for instance, the deactivation processing unit 22b determines whether the value of the MFP ID and the value of the optional function code are valid or not. In other words, it is determined whether there is any multi-function peripheral corresponding to the value of the MFP ID and there is any optional function corresponding to the value of the optional function code.

If the deactivation processing unit 22b determines that a deactivation key should not be issued, then the deactivation processing unit 22b does not issue a deactivation key, and ends a process for the deactivation key issue request.

If the deactivation processing unit 22b determines that a deactivation key should be issued, then the web server 2a transmits web-page data of a confirmation screen before deactivation to the web browser 1a of the multi-function peripheral 1 (Step S25).

The web browser 1a of the multi-function peripheral 1 receives the web-page data, and causes the display device 12 to display a screen for confirmation before deactivation based on the web-page data. On this screen, a name of the optional function or the optional function code, the MFP ID, and an OK button are displayed for receiving a user operation for confirmation.

While the screen is displayed, if a user operation to push down the OK button for confirmation is input to the input device 12b, then the web browser 1a detects the user operation, and transmits information on the user operation to the web server 2a of the key management server machine 2 (Step S27).

In the key management server machine 2, if the web server 2a receives the information on the user operation, then the deactivation processing unit 22b generates a deactivation key (Step S28). The deactivation key is generated from the MFP ID and the optional function code received from the multi-function peripheral 1. For instance, the MFP ID and the optional function code are set as arguments of a function, and the value of the function is calculated as the deactivation key. If each of URLs has been specified for each of optional functions, then an optional function code of an optional function to be activated is identified from the URL at which the deactivation key issue request is received.

After the deactivation processing unit 22b generates a deactivation key, the web server 2a transmits the deactivation key to the web browser 1a of the multi-function peripheral 1, i.e. the web browser that transmitted the deactivation key issue request (Step S29).

In the multi-function peripheral 1, the web browser 1a receives the deactivation key, and the deactivation processing unit 16c determines whether or not the deactivation key is valid (Step S30). Specifically, the deactivation processing unit 16c calculates a deactivation key from information stored in the data storage device 17 in the same way (e.g. using the same function or formula) as that in the deactivation processing unit 22b of the key management server 2, and determines whether the calculated deactivation key is identical to the received deactivation key or not in order to determine whether the deactivation key is valid.

If the deactivation processing unit 16c determines that the deactivation key is not valid, then the web browser 1a causes the display device 12a to display a screen with a message that the deactivation is failed.

Otherwise, the deactivation processing unit 16c determines that the deactivation key is valid, then the deactivation processing unit 16c performs deactivation (Step S31). Specifically, the deactivation processing unit 16c changes the value of activation status information on an optional function to be deactivated to the value "deactivated" in the optional function table 17c. As a result, the optional function becomes unavailable, and the control unit 16a prohibits a user from using the optional function. The deactivation processing unit 16c generates a return code of the optional function after the deactivation.

After the deactivation is completed by the deactivation processing unit 16c, the web browser 1a transmits the return code to the web server 2a of the key management server machine 2 (Step S32).

In the key management server machine 2, the web server 2a receives the return code, and the deactivation processing unit 22b updates the activation management table 23c by providing a command to the data processing unit 22c (Step S33). Specifically, the value of the activation status information on the deactivated optional function of the multi-function peripheral 1 is changed from "activated" to "deactivated". It should be noted that activation status information with the value "deactivated" is an instance of the deactivation completion information.

As mentioned above, deactivation for an optional function of the multi-function peripheral 1 is performed.

In the aforementioned deactivation process, the MFP ID and the optional function code are transmitted with the deactivation key issue request from the multi-function peripheral 1 to the key management server machine 2. Alternatively, the issued activation key may be transmitted with the deactivation key issue request. Specifically, in the multi-function peripheral 1, the issued activation key may be registered in association with the optional function in the optional function table 17c, and the activation key registered in the table 17c may be transmitted with the deactivation key issue request. On the other hand, in the key management server machine 2, the issued activation key may be registered in association with the MFP ID and the optional function code in the activation management table 23c, and a deactivation key may be issued for an optional function of which the registered activation key is identical to the received activation key. Alternatively, the deactivation key may be generated not from the MFP ID and the optional function code but from the activation key. Specifically, when the deactivation key is generated from the activation key, the deactivation key may be generated with a function or formula that the activation key is set to an argument.

In Embodiment 1, the key management server machine 2 combines a web server function by the web server 2a; an application server function that issues an activation key and a deactivation key; and a database server function that maintains activation status information.

As mentioned above, the activation system of Embodiment 1 has the multi-function peripheral 1 and the key management server machine 2.

The multi-function peripheral 1 has the network communication device 11 capable of communicating with the web server 2a via the network 3; the web browser 1a that accesses the web server 2a via communication by the network communication device 11, and acquires an activation key from the web server 2a; and the activation processing unit 16b that activates an optional function with the activation key acquired by the web browser 1a. On the other hand, the key management server machine 2 has the activation processing unit 22a that generates an activation key corresponding to an optional function of the multi-function peripheral 1; and the web server 2a that receives identification information on the multi-function peripheral 1 and identification information on the optional function, and transmits an activation key to the multi-function peripheral 1. This activation key is corresponding to an optional function specified by the identification information on the optional function.

Therefore, the multi-function peripheral 1 directly acquires an activation key from the web server 2a by the web browser 1a without any physical media such as USB memory product, and consequently, activation is performed at low costs. In addition, by means of the web browser 1a, it is possible to easily produce a user interface used for the activation.

Further, the web browser 1a of the multi-function peripheral 1 accesses one of URLs of the web server 2a via communication by the network communication device 11, and acquires an activation key from the web server 2a. Ones of the URLs are corresponding to respective optional functions. The web server 2a of the key management server 2 receives an activation key issue request from the multi-function peripheral 1 to an URL corresponding to an optional function to be activated, and transmits an activation key corresponding to an optional function specified by the URL. This activation key is transmitted to the web browser 1a of the multi-function peripheral 1. Therefore, it is unnecessary to transmit and receive data other than URL to identify an optional function to be activated.

Furthermore, the multi-function peripheral 1 has the network communication device 11 capable of communicating with the web server 2a via the network 3; the web browser 1a that accesses the web server 2a via communication by the network communication device 11, and acquires a deactivation key from the web server 2a; and the deactivation processing unit 16c that activates an optional function with the deactivation key acquired by the web browser 1a. On the other hand, the key management server machine 2 has the deactivation processing unit 22a that generates a deactivation key corresponding to an optional function of the multi-function peripheral 1; and the web server 2a that receives identification information on the multi-function peripheral 1 and identification information on the optional function, and transmits a deactivation key to the multi-function peripheral 1. This deactivation key is corresponding to an optional function specified by the identification information on the optional function.

Therefore, the multi-function peripheral 1 directly acquires a deactivation key from the web server 2a by the web browser 1a without any physical media such as USB memory product, and consequently, deactivation is performed at low costs, and an illegal use of an optional function is prevented after deactivation of the optional function.

Furthermore, in the key management server machine 2, the web server 2a issues an activation key to the multi-function peripheral 1 to activate an optional function, and issues a deactivation key companion to the activation key to the multi-function peripheral 1 to deactivate the optional function. The data storage device 23 stores activation key issue information when an optional function of the image forming apparatus has been activated, and stores deactivation completion information when the optional function that has been activated is deactivated. The activation key issue information indicates the optional function of the multi-function peripheral 1 has been activated, and the deactivation completion information indicates the optional function that had been activated was deactivated. Therefore, the multi-function peripheral 1 directly acquires a deactivation key from the web server 2a by the web browser 1a without any physical media such as USB memory product, and consequently, deactivation is performed at low costs, and an illegal use of an optional function is prevented after deactivation of the optional function.

In addition, the multi-function peripheral 1 directly acquires an activation key from the web server 2a by the web browser 1a without any physical media such as USB memory product, and consequently, activation is performed at low costs. Moreover, by means of the web browser 1a, it is possible to easily produce a user interface used for the activation. Here, the key management server machine 2 combines a web server function, an application server function, and a database server function.

Embodiment 2

Figure 9:
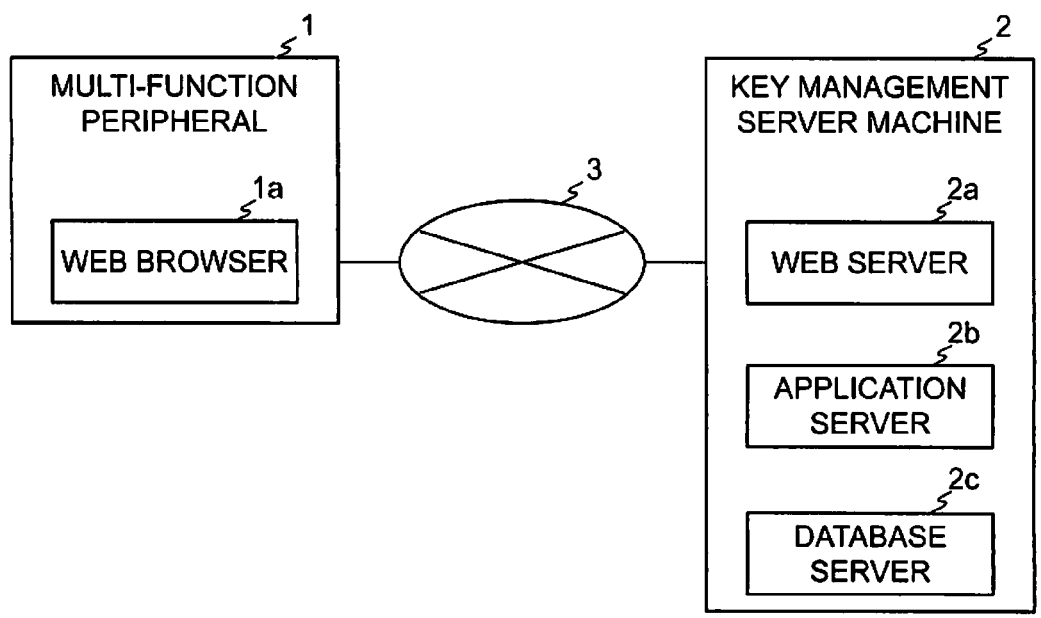
FIG. 9 shows a block diagram that indicates a configuration of an activation-deactivation system according to Embodiment 2 of this invention.

FIG. 9 shows a block diagram that indicates a configuration of an activation-deactivation system according to Embodiment 2 of this invention.

In Embodiment 2, an application server 2b acts as the activation processing unit 22a and the deactivation processing unit 22b in Embodiment 1, and a database server 2c acts as the database processing unit 22c in Embodiment 1. The multi-function peripheral 1 of Embodiment 2 is identical to that of Embodiment 1.

Figure 10:
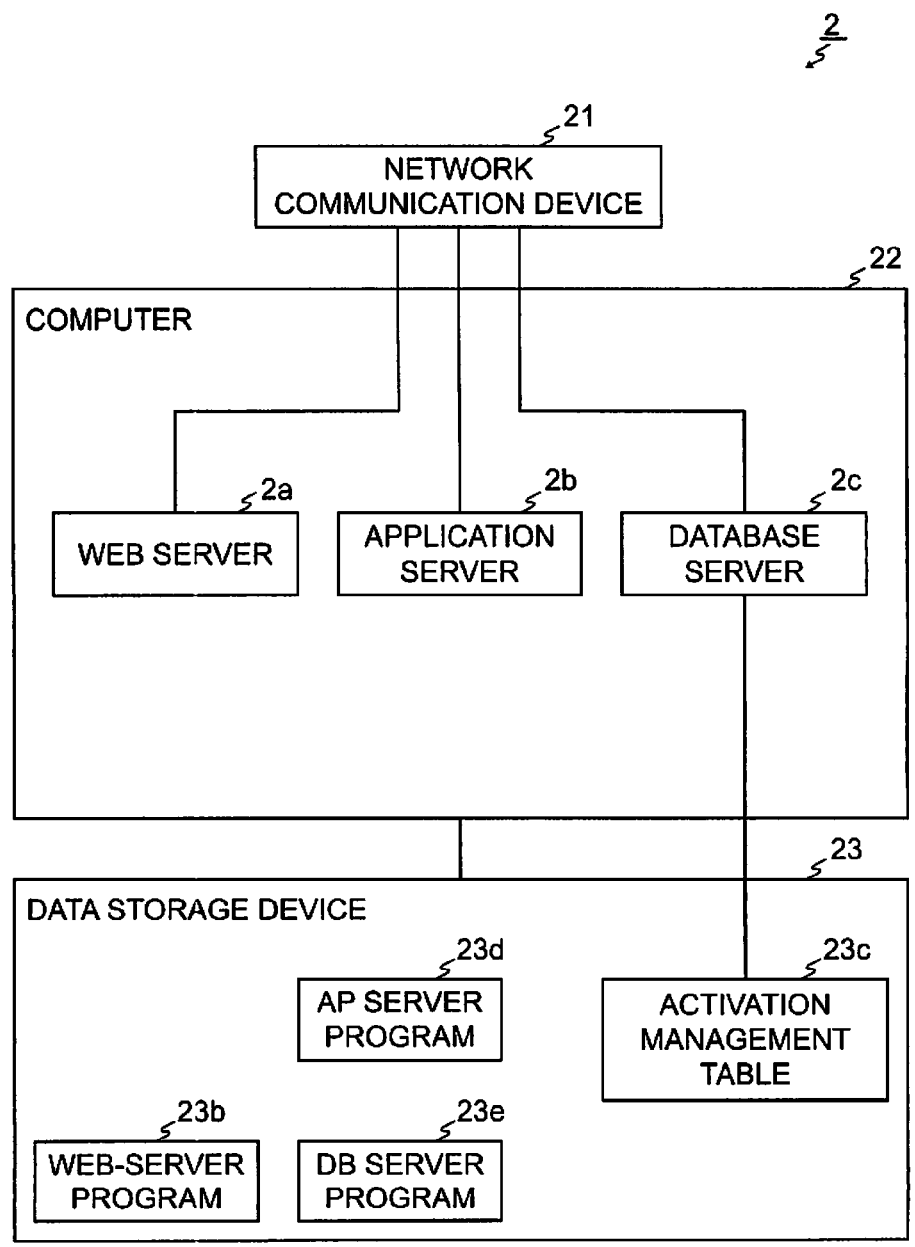
FIG. 10 shows a block diagram that indicates a configuration of a key management server machine in FIG. 9.

FIG. 10 shows a block diagram that indicates a configuration of the key management server machine 2 in FIG. 9. In Embodiment 2, an AP server program 23d is executed in the computer 22 to realize the application server 2b, and a DB server program 23e is executed in the computer 22 to realize the database server 2c. Other components in FIG. 10 are identical to those in FIG. 4.

In Embodiment 2, the web server 2a, the application server 2b and the database server 2c perform server-to-server communication with each other, and the servers 2a, 2b and 2c perform processes as well as the key management server machine 2 of Embodiment 1. Therefore, the system of Embodiment 2 also performs an activation process and a deactivation process as well as the system of Embodiment 1.

As mentioned above, in the activation system of Embodiment 2, the multi-function peripheral 1 has the web browser 1a, and transmits identification information on the multi-function peripheral 1 and identification information on an optional function to the web server 2a by the web browser 1a, and receives an activation key for the optional function by the web browser 1a, and activates the optional function with the activation key. On the other hand, the server side performs processes as follows. (a) The application server 2b receives identification information on the multi-function peripheral 1 and identification information on an optional function from the web server 2a, and generates an activation key for the optional function, and transmits the activation key to the web server 2a. (b) The web server 2a receives the identification information on the multi-function peripheral 1 and the identification information on the optional function from the web browser 1a of the multi-function peripheral 1, and transfers the identification information on the multi-function peripheral 1 and the identification information on the optional function to the application server 2b, and receives the activation key from the application server 2b, and transmits the activation key to the web browser 1a of the multi-function peripheral 1. (c) The database server 2c maintains activation key issue information after the web server 2a transmits the activation key. The activation key issue information indicates that the activation key is issued for the optional function of the multi-function peripheral 1.

Therefore, the multi-function peripheral 1 directly acquires an activation key from the web server 2a by the web browser 1a without any physical media such as USB memory product, and consequently, activation is performed at low costs. In addition, by means of the web browser 1a, it is possible to easily produce a user interface used for the activation. Furthermore, since the server side (i.e. the servers) is divided into the web server, the application server and the database server, the servers can be individually connected to either a network or different networks.

Further, the deactivation system of Embodiment 2 performs deactivation in the same manner as activation. Therefore, the server side confirms completion of deactivation. Since any physical media are not used, it is difficult to make an illegal copy of an activation key. Consequently, after deactivation of an optional function, it is prevented to use the optional function with an illegal copy of the activation key.

Embodiment 3

Figure 11:
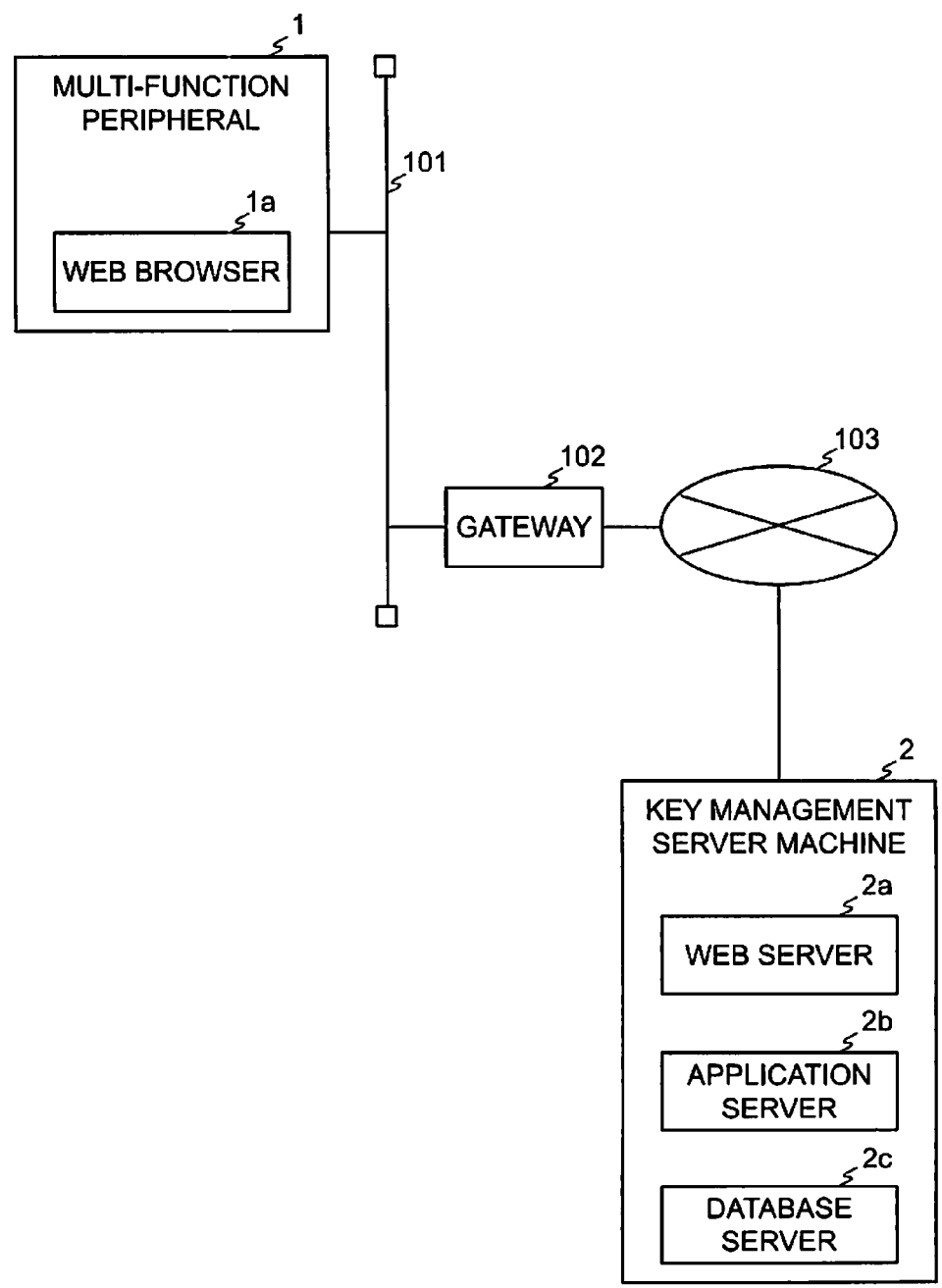
FIG. 11 shows a block diagram that indicates a configuration of an activation-deactivation system according to Embodiment 3 of this invention.

FIG. 11 shows a block diagram that indicates a configuration of an activation-deactivation system according to Embodiment 3 of this invention. In Embodiment 3, the multi-function peripheral 1 is connected to a local network 101, and the key management server machine 2 identical to that of Embodiment 2 is connected to Internet 103. The local network 101 is connected via a gateway 102 to Internet 103. The gateway 102 has a firewall function. The gateway 102 may be a router.

The multi-function peripheral 1 of Embodiment 3 is identical to that of Embodiment 1. The system of Embodiment 3 also performs an activation process and a deactivation process as well as the system of Embodiment 1 or 2.

As mentioned above, in Embodiment 3, the web server 2a, the application server 2b and the database server 2c are placed on Internet 103. Therefore, it is possible to build the system at low costs.

Embodiment 4

Figure 12:
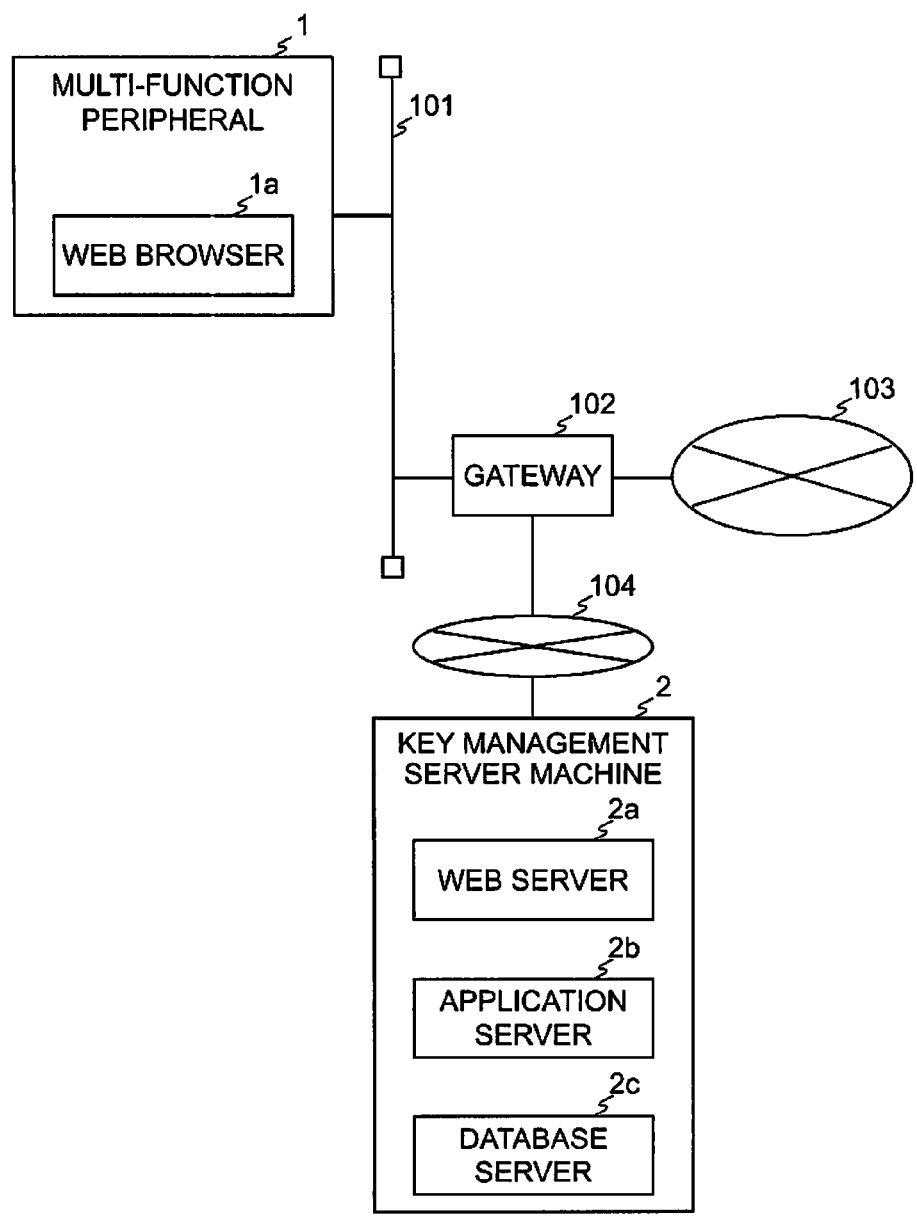
FIG. 12 shows a block diagram that indicates a configuration of an activation-deactivation system according to Embodiment 4 of this invention.

FIG. 12 shows a block diagram that indicates a configuration of an activation-deactivation system according to Embodiment 4 of this invention. In Embodiment 4, the multi-function peripheral 1 is connected to a local network 101, and the key management server machine 2 identical to that in Embodiment 2 is connected to another local network 104. The local network 104 is a network area administrated by a manufacturer company or a sales company of the multi-function peripheral 1. The local network 101 is a network administrated by a customer using the multi-function peripheral 1. The local network 101 is connected via a gateway 102 to the local network 104. Therefore, the local network 101 is another IP network than the local network 104, and the local network 104 is another IP network than Internet 103.

The multi-function peripheral 1 of Embodiment 4 is identical to that of Embodiment 1. Therefore, the system of Embodiment 4 also performs an activation process and a deactivation process as well as the system of any of Embodiments 1, 2 and 3.

As mentioned above, in Embodiment 4, the web server 2a, the application server 2b and the database server 2c are placed on the network 104 administrated by a service provider. Therefore, since the system does not use Internet 103, the service provider can regulate their service relatively freely.

Embodiment 5

Figure 13:
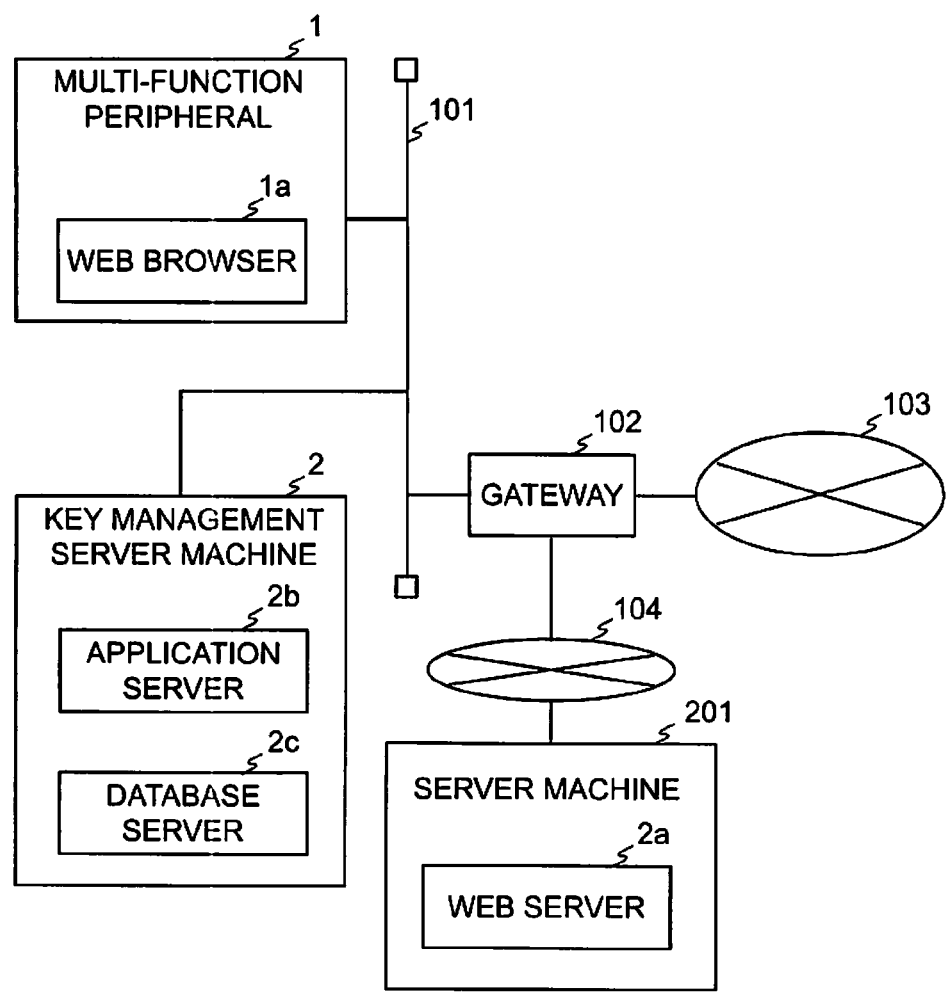
FIG. 13 shows a block diagram that indicates a configuration of an activation-deactivation system according to Embodiment 5 of this invention.

FIG. 13 shows a block diagram that indicates a configuration of an activation-deactivation system according to Embodiment 5 of this invention. In Embodiment 5, the multi-function peripheral 1 is connected to a local network 101, and the key management server machine 2 is connected to the local network 101, and has the application 2b and the database server 2c as well as Embodiment 2. In addition, another server machine 201 is connected to another local network 104. The server machine 201 has the web server 2a identical to that in Embodiment 2. The local network 104 is a network area administrated by a manufacturer company or a sales company of the multi-function peripheral 1. The local network 101 is a network administrated by a customer using the multi-function peripheral 1. The local network 101 is connected via a gateway 102 to the local network 104. Therefore, the local network 101 is another IP network than the local network 104, and the local network 104 is another IP network than Internet 103.

The multi-function peripheral 1 of Embodiment 5 is identical to that of Embodiment 1. Therefore, the system of Embodiment 5 also performs an activation process and a deactivation process as well as the system of any of Embodiments 1 to 4.

As mentioned above, in Embodiment 5, the application server 2b and the database server 2c are placed on the network 101 of a customer, and the web server 2a is placed on the network 104 administrated by a service provider. Therefore, since the system does not use Internet 103, the service provider can regulate their service relatively freely. Moreover, since the application server 2b and the database server 2c are placed on the network 101 of a customer, even if user information such as user ID is used in the system, the user information is maintained in the network 101 of a customer. Therefore, the system keeps security for the user information.

The description of the present invention has been presented for purposes of illustration and description, and is not intended to be exhaustive or limited to the invention in the form disclosed. Many modifications and variations will be apparent to those of ordinary skill in the art.

For example, in any of the aforementioned embodiments, in order to re-activate an optional function with the value "deactivated" as the activation status information in the table 23c of the server machine 2, the activation processing unit 22a or the application server 2b generates a new activation key different from the activation keys that were issued before for the multi-function peripheral 1, and issues the generated activation key to the multi-function peripheral 1. Specifically, in this case, the new activation key is generated by another function or formula different from the function or formula that has been used to generate the activation keys before. The new activation keys are also generated from the MFP ID and the optional function code with the another function or formula. Therefore, for re-activation, the multi-function peripheral 1 verifies the new activation key with the another function or formula.

Further, in any of the embodiments, if a program to realize the optional function to be activated has not been installed, then the activation processing unit 16a downloads and installs the program, for example, from the key management server machine 2 or another server machine by the web browser 1a.

Furthermore, in the embodiments, the multi-function peripheral 1 is used as an instance of the image forming apparatus. Alternatively, another type of image forming apparatuses (e.g. printer, facsimile machine, or the like) capable of activation and/or deactivation of an optional function may be used as the image forming apparatus. Furthermore, in the embodiments, only one multi-function peripheral (that is, the multi-function peripheral 1) is shown in the figures. Alternatively, pluralities of multi-function peripherals with the same configuration as the multi-function peripheral 1 may be connected to the network 3 or 101. Alternatively, one or more other image forming apparatus may be connected to the network 3 or 101 together with the multi-function peripheral 1.

Furthermore, in the embodiments, the system performs both of activation and deactivation. Alternatively, the system may perform only one of activation and deactivation.

Furthermore, in any of the embodiments, the web browser 1a and the web server 2a may perform encrypted communication with each other.

Furthermore, in the embodiments, the web browser 1a runs in the processor 12c of the operation panel 12. Alternatively, the browser program 17b may be executed by a computer in the main controller 17, so that the web browser 1a runs in the main controller 17.

Furthermore, in the embodiments, the number of times of activation is registered in the activation management table 23c in the key management server machine 2. Alternatively, the number of times of deactivation may be registered in the activation management table 23c. In case that the number of times of deactivation is registered instead of the number of times of activation, an activation key is issued only if the number of times of deactivation in the table 23c is less than a predetermined value.

Furthermore, in the embodiments, the network communication device 11 in the multi-function peripheral 1 is an instance of the network communication unit, and the activation processing unit 16*b* in the multi-function peripheral 1 is an instance of the activating unit. In the multi-function peripheral 1, the display device 12*a* is an instance of the display unit, and the input device 12*b* is an instance of the input unit, and the data storage unit 17 is an instance of the storage unit. In the key management server machine 2, the activation processing unit 22*a* is an instance of the activation key generating unit.

Furthermore, in the embodiments, the deactivation processing unit 16*c* in the multi-function peripheral 1 is an instance of the deactivating unit. In the key management server machine 2, the deactivation processing unit 22*b* is an instance of the deactivation key generating unit. The data storage unit 23 is an instance of the storage unit. The aforementioned return code is an instance of the notification of finished deactivation.

In terms of this invention, deactivation is performed at low costs without any physical media such as USB memory product, and an illegal use of an optional function is prevented after deactivation of the optional function.

For example, this invention is applicable to an image forming apparatus that allows a user to use an optional function after the user purchase a license to use the optional function.

What is claimed is:

1. An activation system, comprising:
   an image forming apparatus;
   an application server;
   a database server; and
   a web server;
   wherein the image forming apparatus, the application server, the database server and the web server are capable of communicating with each other;
   the image forming apparatus comprises a web browser, and transmits identification information on the image forming apparatus and identification information on an optional function to the web server by the web browser, and receives an activation key for the optional function by the web browser, and activates the optional function with the activation key;
   the application server receives identification information on the image forming apparatus and identification information on an optional function from the web server, and generates an activation key for the optional function, and transmits the activation key to the web server;
   the web server receives the identification information on the image forming apparatus and the identification information on the optional function, and transfers the identification information on the image forming apparatus and the identification information on the optional function to the application server, and receives the activation key from the application server, and transmits the activation key to the web browser of the image forming apparatus;
   the database server maintains activation key issue information after the web server transmits the activation key, and the activation key issue information indicates that the activation key is issued for the optional function of the image forming apparatus wherein the application server generates the activation key by a different method if the optional function was previously deactivated;
   the image forming apparatus transmits identification information on the image forming apparatus and identification information on an optional function to the web server by the web browser, and receives a deactivation key for the optional function by the web browser, and deactivates the optional function with the deactivation key;
   the application server receives identification information on the image forming apparatus and identification information on an optional function from the web server, and generates a deactivation key for the optional function, and transmits the deactivation key to the web server;
   the web server receives the identification information on the image forming apparatus and the identification information on the optional function, and transfers the identification information on the image forming apparatus and the identification information on the optional function to the application server, and receives the deactivation key from the application server, and transmits the deactivation key to the web browser of the image forming apparatus; and
   the database server maintains deactivation completion information associated with the activation key issue information, and the deactivation completion information indicates that the optional function that had been activated in the image forming apparatus was deactivated.

2. The activation system according to claim 1, wherein:
   the image forming apparatus is connected to a local network connected via a gateway to Internet; and
   the application server, the database server and the web server are connected to Internet.

3. The activation system according to claim 1, wherein:
   the image forming apparatus is connected to a local network connected via a gateway to another local network; and
   the application server, the database server and the web server are connected to the another local network.

4. The activation system according to claim 1, wherein:
   the image forming apparatus is connected to a local network connected via a gateway to another local network;
   the application server and the database server are connected to the local network that the image forming apparatus is connected to; and
   the web server is connected to the another local network.

5. The activation system according to claim 3, wherein:
   the another local network is a network other than Internet.

* * * * *